July 21, 1936. K. W. MAUSER 2,048,457
BUILDING MATERIAL
Filed Aug. 31, 1933
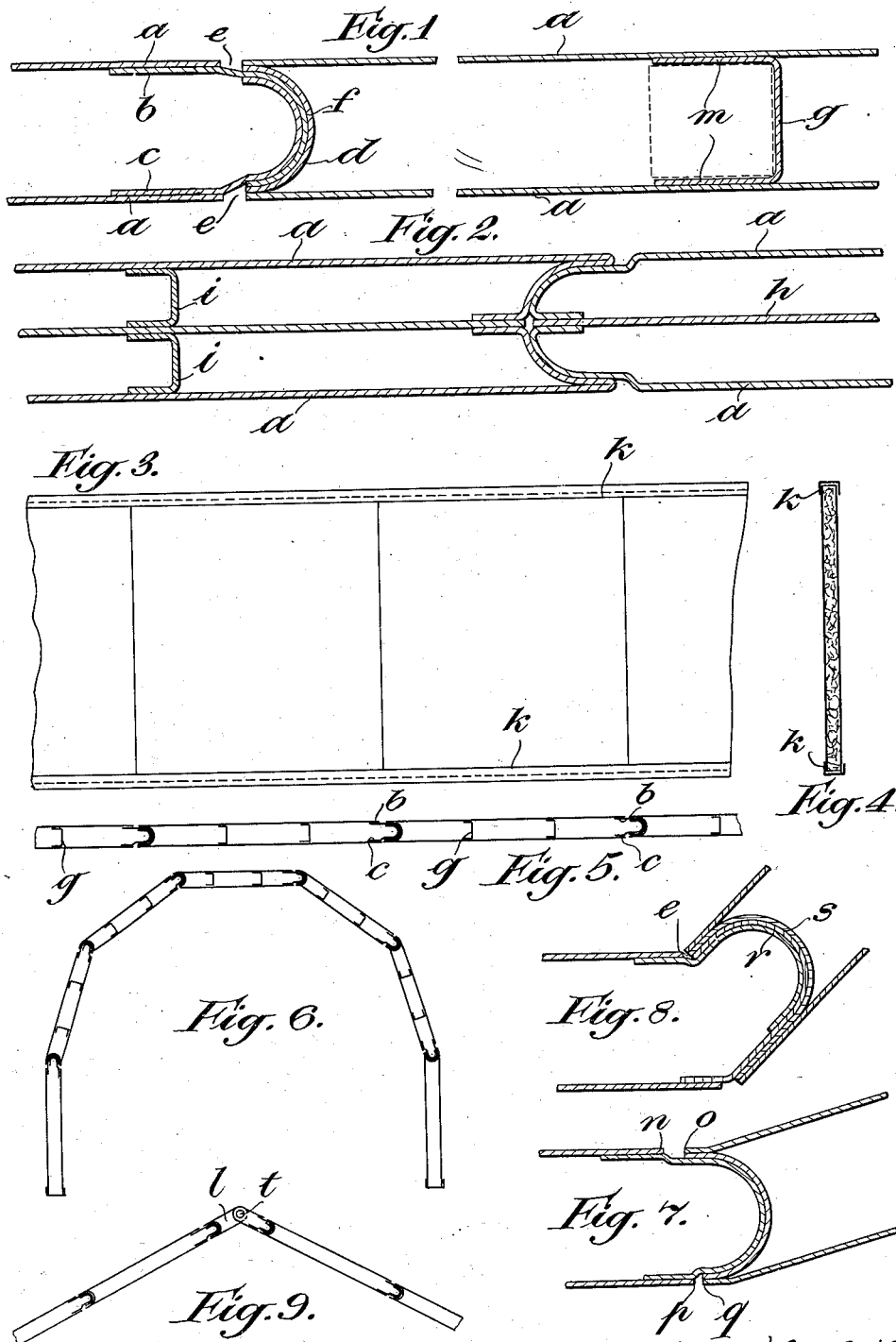

Patented July 21, 1936

2,048,457

UNITED STATES PATENT OFFICE 2,048,457

BUILDING MATERIAL

Karl Wilhelm Mauser, Waldeck, Germany

Application August 31, 1933, Serial No. 687,717
In Germany March 7, 1933

5 Claims. (Cl. 189—34)

This invention relates to a metal building element which is made flexible by a special tongue and groove construction and which consists of two or more metal plates held at a distance from one another and is used with advantage for making sound and fire-proof walls, floors and ceilings, for example for ships cabins, living rooms or for partitions in general.

Constructional elements of metal which have a rigid structure in their joints are known. Metal arrangements have not hitherto been known which are pivotally arranged at their joints and which, without additional means, can be placed together where required in any desired shape. The object of the present invention is to produce a sound and fire-proof constructional element of metal which meets all these requirements and which more particularly can be employed advantageously, for example in ship building for ships cabins.

The particular feature of the invention consists in providing the constructional elements with tongues and grooves for connecting the elements together. The tongues and grooves on account of their round or oval form, allow the constructional elements to be placed at an angle with respect to one another without the disengagement of the tongue of one element in the groove of the other. It is therefore possible without employing additional means to construct a wall of any desired shape easily and conveniently by simply assembling the separate elements where required. The savings in time and cost of assembly are enormous. The advantages of the extensive usefulness, unlimited durability, safety from fire, are particularly important in the construction of ships cabins. The possibility of changing the shape of the walls constructed of several single elements is a further advantage in the construction of ships cabins.

The sound-proof quality of the constructional elements is obtained by inserting additional metal plates and by filling the hollow spaces with sound insulating material, for example glass wool.

The invention is illustrated by way of example only in the accompanying drawing, in which Fig. 1 is a cross section of a wall structure, Fig. 2 is a cross section of another form of wall structure, Fig. 3 is an elevational view of the wall, Fig. 4 is a vertical cross section of Fig. 3, Fig. 5 is a horizontal cross section of Fig. 3, Fig. 6 is a horizontal cross section showing angular relation of several constructional elements, Figs. 7 and 8 show cross sections of two forms of angularly displaced elements and Fig. 9 is a hinge construction for the elements.

In the accompanying drawing, Fig. 1 shows a cross-section through two adjoining constructional elements. The metal walls $a$ of the one element are provided at the ends with oval parts $b$, $c$ which interengage loosely and form the tongue. The parts $b$ and $c$ when inserted in the part $d$ forming the groove have a spreading action so that the separate elements are held together. The construction of the tongue may also be such that there is no spreading action or clamping in the groove. The securing of the parts $b$, $c$ in the metal walls $a$ is preferably effected by spot welding. In the intermediate space $f$ a packing or insulating layer may be provided if necessary.

For connecting the metal walls $a$, web-like intermediate pieces $g$ are used which have the advantage that the connection can be effected in one operation by spot welding by inserting a metal bar between the walls $a$, as illustrated in the drawing in broken lines.

Fig. 2 shows a cross-section through two adjoining constructional elements in which a further intermediate wall $h$ is provided. In order to make the wall sound proof, several intermediate walls may be provided. The web-like intermediate pieces $i$ inserted between the several walls for connecting them together can be secured in one operation by simple spot welding in the same manner as the intermediate piece $g$. It is further clear from Fig. 2 that the parts forming the tongue and groove can be formed directly from the walls $a$ or the tongue parts can be made in one piece as a separate part.

Fig. 3 shows a straight wall composed of several constructional elements which is held above and below in guiding strips $k$. Fig. 4 shows a vertical section, Fig. 5, a horizontal section through the wall of Fig. 3.

For making angular or other shaped walls, as shown, for example, in Fig. 6, the constructional elements can be turned to a certain extent by leaving a space $e$ at the place of engagement of the tongue and groove and also by providing an offset arrangement of the edges $n$, $o$, $p$, $q$ according to Fig. 7. The offset arrangement of the edges $n$, $o$, $p$, $q$ according to Fig. 7 allows the building elements to be placed at a greater angle to one another. A further construction of the groove $s$ and tongue $r$ for angular arrangement of the constructional elements is shown in Fig. 8. The angular arrangement of the metal walls can also be effected, as shown in Fig. 9, by providing a joint member $l$ consisting of two constructional elements the rounded ends of which interengage in the manner of a hinge and are held by a rod $t$.

What I claim is:

1. A metal constructional element for making fire- and sound-proof walls, floors, ceilings and partitions of rooms and other buildings, comprising a plurality of metal plates, means for rigidly securing the metal plates at a distance from and parallel to one another, a section of metal plate curved into approximately semi-circular shape and fitted between and secured to the metal plates at one end to form a groove, and a plurality of sections of metal plate curved into approximately semi-circular shape and secured to the metal plates, at least one to each metal plate, to form a tongue, the tongues and grooves enabling a number of elements to be interengaged end to end by means of joints allowing of pivotal movement.

2. A metal constructional element for making fire- and sound-proof walls, floors, ceilings and partitions of rooms and other buildings, comprising a plurality of metal plates, means for rigidly securing the metal plates at a distance from and parallel to each other, a section of metal plate formed into a groove between the metal plates at one end and a plurality of sections of metal plate curved into a shape corresponding to that of the groove and secured to the metal plates, at least one to each metal plate, to form a tongue, the tongues and grooves enabling a number of elements to be interengaged end to end by means of joints allowing of pivotal movement.

3. A metal constructional element as claimed in claim 2, in which the metal plates on opposite sides are relatively displaced in the longitudinal direction.

4. A metal constructional element as claimed in claim 2, having channel-shaped distancing members, between the metal plates.

5. A metal constructional element as claimed in claim 2, having channel-shaped distancing members between the metal plates in which the tongue and groove members and the distancing members are secured to the metal plates by spot welding.

KARL WILHELM MAUSER.